(12) United States Patent
Bevan et al.

(10) Patent No.: US 8,460,003 B2
(45) Date of Patent: Jun. 11, 2013

(54) ANTHROPOMORPHIC DEVICE FOR MILITARY AND CIVILIAN EMERGENCY MEDICAL TREATMENT TRAINING

(75) Inventors: Thomas E. Bevan, Atlanta, GA (US); Alex Hill, Marietta, GA (US)

(73) Assignee: K-Force Government Solutions, Fairfax, VA (US)

( * ) Notice: Subject to any disclaimer, the term of this patent is extended or adjusted under 35 U.S.C. 154(b) by 108 days.

(21) Appl. No.: 12/833,585

(22) Filed: Jul. 9, 2010

(65) Prior Publication Data

US 2011/0008760 A1 Jan. 13, 2011

Related U.S. Application Data

(60) Provisional application No. 61/213,762, filed on Jul. 10, 2009.

(51) Int. Cl.
*G09B 23/28* (2006.01)

(52) U.S. Cl.
USPC ............................ 434/262; 434/268; 434/274

(58) Field of Classification Search
USPC ................................................. 434/262, 267
See application file for complete search history.

(56) References Cited

U.S. PATENT DOCUMENTS

| | | | | |
|---|---|---|---|---|
| 3,520,071 A | * | 7/1970 | Clark et al. | 434/265 |
| 3,557,471 A | * | 1/1971 | Payne et al. | 34/270 |
| 3,564,729 A | * | 2/1971 | Ackerman | 34/266 |
| 3,620,611 A | * | 11/1971 | Parrent et al. | 353/20 |
| 3,947,974 A | * | 4/1976 | Gordon et al. | 434/266 |
| 4,331,426 A | * | 5/1982 | Sweeney | 434/265 |
| 4,588,383 A | * | 5/1986 | Parker et al. | 434/265 |
| 4,773,865 A | * | 9/1988 | Baldwin | 434/268 |
| 4,915,635 A | * | 4/1990 | Ingenito et al. | 434/396 |
| 5,018,977 A | * | 5/1991 | Wiley et al. | 434/274 |
| 5,137,458 A | * | 8/1992 | Ungs et al. | 434/262 |
| 5,259,764 A | * | 11/1993 | Goldsmith | 434/267 |
| 5,419,706 A | * | 5/1995 | Levy et al. | 434/409 |
| 5,509,810 A | * | 4/1996 | Schertz et al. | 434/262 |
| 5,779,484 A | * | 7/1998 | Lampotang et al. | 434/266 |
| 5,803,746 A | * | 9/1998 | Barrie et al. | 434/267 |
| 5,853,292 A | * | 12/1998 | Eggert et al. | 434/262 |
| 5,900,923 A | * | 5/1999 | Prendergast et al. | 351/221 |
| 5,945,056 A | * | 8/1999 | Day et al. | 264/250 |
| 6,048,209 A | * | 4/2000 | Bailey | 434/267 |
| 6,050,826 A | * | 4/2000 | Christianson et al. | 434/262 |
| 6,428,321 B1 | * | 8/2002 | Jurmain et al. | 434/238 |

(Continued)

OTHER PUBLICATIONS

Bear et al., "Neuroscience Exploring the Brain", 2001, pp. 740-741.

(Continued)

*Primary Examiner* — Robert J Utama
(74) *Attorney, Agent, or Firm* — Holland & Knight LLP; John P. Moran

(57) ABSTRACT

An anthropomorphic training device for training of military and civilians in emergency medical care is presented. Such training devices provide stimuli to cue emergency medical personnel to perform required treatments, and are able to withstand simulated field medical training conditions. The devices provide realistic simulation of wounds, human anatomy and phenomena associated with traumatic injury (e.g. bleeding) and to provide immediate stimulus feedback on the success of the medical procedures. The simulation also provides realism sufficient to induce emotional response in the trainee, so that emotional responses can be extinguished or reduced prior to treatment of an actual injured patient.

13 Claims, 5 Drawing Sheets

U.S. PATENT DOCUMENTS

| | | | |
|---|---|---|---|
| 6,527,558 B1* | 3/2003 | Eggert et al. | 434/262 |
| 6,575,757 B1* | 6/2003 | Leight et al. | 434/273 |
| 6,597,948 B1* | 7/2003 | Rockwell et al. | 607/5 |
| 6,638,073 B1* | 10/2003 | Kazimirov et al. | 434/272 |
| 6,780,016 B1* | 8/2004 | Toly | 434/262 |
| 6,969,259 B2* | 11/2005 | Pastrick et al. | 434/265 |
| 7,021,940 B2* | 4/2006 | Morris et al. | 434/268 |
| 7,114,954 B2* | 10/2006 | Eggert et al. | 434/262 |
| 7,238,027 B2* | 7/2007 | Kilvington et al. | 434/430 |
| 7,316,568 B2* | 1/2008 | Gordon et al. | 434/262 |
| 7,350,704 B2* | 4/2008 | Barsness et al. | 235/435 |
| 7,601,003 B2* | 10/2009 | Quest et al. | 434/254 |
| 7,665,995 B2* | 2/2010 | Toly | 434/262 |
| 7,811,090 B2* | 10/2010 | Eggert et al. | 434/273 |
| 2003/0043095 A1* | 3/2003 | Silverbrook | 345/87 |
| 2003/0232318 A1* | 12/2003 | Altenhofen et al. | 434/362 |
| 2004/0126746 A1* | 7/2004 | Toly | 434/262 |
| 2004/0234933 A1* | 11/2004 | Dawson et al. | 434/262 |
| 2005/0100873 A1* | 5/2005 | Meythaler et al. | 434/267 |
| 2007/0292829 A1* | 12/2007 | King et al. | 434/268 |
| 2008/0227073 A1* | 9/2008 | Bardsley et al. | 434/267 |
| 2009/0011394 A1* | 1/2009 | Meglan et al. | 434/268 |
| 2010/0003657 A1* | 1/2010 | Shibui et al. | 434/267 |

OTHER PUBLICATIONS

Gross, David C., "Report from the Fidelity Implementation Study Group", 1999 (88 pgs.).

* cited by examiner

ANTHROPOMORPHIC DEVICE FOR MILITARY AND CIVILIAN EMERGENCY MEDICAL TREATMENT TRAINING

CROSS-REFERENCE TO RELATED U.S. APPLICATION DATA

This application is related to and claims priority to Provisional Patent Application No. 61/213,762. Filed on 10 Jul. 2009.

The Government may have certain rights in the invention pursuant to Department of Defense contract N61339-07-C-0015 for the US Army RDECOM with funds from US Army Small Business Innovative Research Program. The system was reduced to practice using a prototype and extensive user evaluations which were conducted.

BACKGROUND OF THE INVENTION

The field of the invention is in training of military and civilian medical personnel to provide prompt, effective treatment of emergency injuries and other medical treatment situations. The field of military medical training has expanded due to the increase in use of reserve and National Guard forces that are being deployed on active duty. Although active duty forces can be sent for training to a few central training facilities, reserve and National Guard forces need to stay close to home. The result is a large increase in the number of pre-deployment training facilities and an increase in the need for training aids. In the civilian community, because of homeland security concerns, training readiness through Federal, state and local facilities must be maintained for wounds, for example, blast injuries, which heretofore were relatively rare events. In order to support these facilities, training devices are needed which support training course objectives.

In order to address the need for training devices, attempts have been made to use existing devices from other fields in the military and civilian emergency training field. The results have not met the needs of trainers or trainees in the military and civilian emergency training field.

Weighted training dummies which were used for fire and rescue were tried in the field of military and civilian training. While such dummies were satisfactory to build the physical conditioning for carrying emergency patients or transporting them on litters, they do not meet training needs for realism or supporting medical treatment tasks.

Educational simulation devices were also tried in the field of medical and civilian training. Such simulation devices had been developed for hospitals and medical schools to educate medical students, nurses and other medical personnel how to treat typical medical conditions in hospital and nursing home environments, such as heart attack, insulin over/underdose. Such educational simulation devices are not intended for the military and civilian emergency training field both with respect to realism and ruggedness. Such simulators are tethered to computers through hardwire and datalinks and also, in some cases, tethered to air compressors, making them impossible to meet field environment conditions and to support patient evacuation training. Because such devices were aimed at education, they did not address specific tasks which emergency medical personnel must carry out, such as application of tourniquets. Such simulators are also relatively expensive. There is therefore a need for training simulation method and apparatus to meet the current training needs of, for example, military and civilian personnel.

Emergency medical treatment tasks are commonly defined by military and civilian medical institutions. For example, a task can be an action which a medic or other personnel takes in accordance with military doctrine or civilian medical protocol. The medic must recognize which tasks to perform and how to perform them, based on the stimuli presented by the patient and the situation. Current training devices do not present adequate stimuli to cue medic tasks or provide realistic stimuli associated with medical treatment scenarios. For example, the anthropomorphic simulators which are used in medical schools do not have the capability to adequately support tourniquet application training with regard to simulated skin realism or the amount of pressure required to stop the bleeding. Examples of such tasks may include: (1) Triage Decisions regarding the order of treatment of patients (2) Airway clearing and maintenance by, for example, nasopharyngeal tube, oral tube or cricothryoidectomy, (3) Breathing support including pneumothorax lancing (4) Bleeding cessation by, for example, application of pressure, tourniquet application or use of hemostatic agents, (5) Body fluid balance by, for example, intravenous or intraosseous infusion (6) Patient Assessment for burns, dislocations, etc. (7) Pain Control by providing analgesics, (8) Splinting Fractures detected by crepitus, (8) Antibiotics Administration using and intravenous or intra osseous line and (9) Evacuation Categorization to determine the priorities and order of transport.

It is well established in the biopsychology literature that there are five separate learning systems in the brain which are mediated by separate structures. (Bear et al. 2001, p 740-1). The five systems are (1) factual (2) experiential (3) procedural (4) skeletal muscle coordination and (5) emotional. In medical training, the factual learning system is typically addressed through didactic classroom training and the others may be addressed in practical exercises, sometimes practical field exercises. The factual learning system involves memorization of facts through language and is believed to be principally mediated by the human cortex. The experiential learning system involves remembering events and generalizing to new events and is believed to be principally mediated by the hippocampus. The procedural learning system involves motor learning (e.g. riding a bicycle) and is believed to be principally mediated by the striatum, constituting the subcortical motor structures. The skeletal muscle coordination system involves learning coordination of motor events and is believed to be principally mediated by the cerebellum. The emotional learning system involves association of perceptions to autonomic preparation for action (e.g. fear, arousal) and is believed to be principally mediated by the amygdala. Because they are primitive, emotional reactions to situations can interfere with display of other types of learning, for example, the sight of a traumatic wound can trigger emotions which interfere with the performance of motor skills, motor coordination and recall of facts and previous experience.

Medics, corpsmen and others providing emergency medical care need to learn and perform using all five learning systems in order to be prepared to effectively and efficiently carry out their required tasks. They need to have a high degree of fidelity or realism. For some circumstances, fidelity or realism can be considered "the degree to which a model or simulation reproduces the state and behavior of a real world object or the perception of a real world object, feature, condition, or chosen standard in a measurable or perceivable manner; a measure of the realism of a model or simulation; faithfulness." (Fidelity Implementation Study Group (Gross, 1999).

Current training devices do not adequately support human neural learning systems, especially in practical exercises or field exercises. Procedural and skeletal muscle coordination cannot currently be fully practiced if the training device does not support the task (e.g. tourniquet application) or if the look-and-feel of the device is not realistic enough. Experiential and emotional learning cannot currently be fully practiced because of limited realism and intrusions on realism such as tethers to electrical or pneumatic systems. Desensitization to trauma situations, wounds and other stimuli are required in order to prepare the trainee for future real situations where hesitation or impairment of motor and coordination skills would result in adverse patient outcomes.

DESCRIPTION OF PREFERRED EMBODIMENTS

The present example embodiment provides a training device for emergency treatment of blast injuries with full fidelity of a simulated lower body with amputations and other wounds which frequently result from blasts from, for example, improvised explosive devices, rocket propelled grenades and domestic bombings. The exemplary embodiment includes a full fidelity lower body simulation, a remote controller and auxiliary equipment required to refill simulated blood and provide power to the system. The system provides the stimuli necessary to train medics, corpsmen and others to perform medical treatment tasks requiring procedural and motor learning as well as to desensitize the trainee requiring emotional and experiential learning. The training system and device meet training needs in terms of providing these stimuli as well as being realistic looking and feeling, and rugged.

Figure 1:
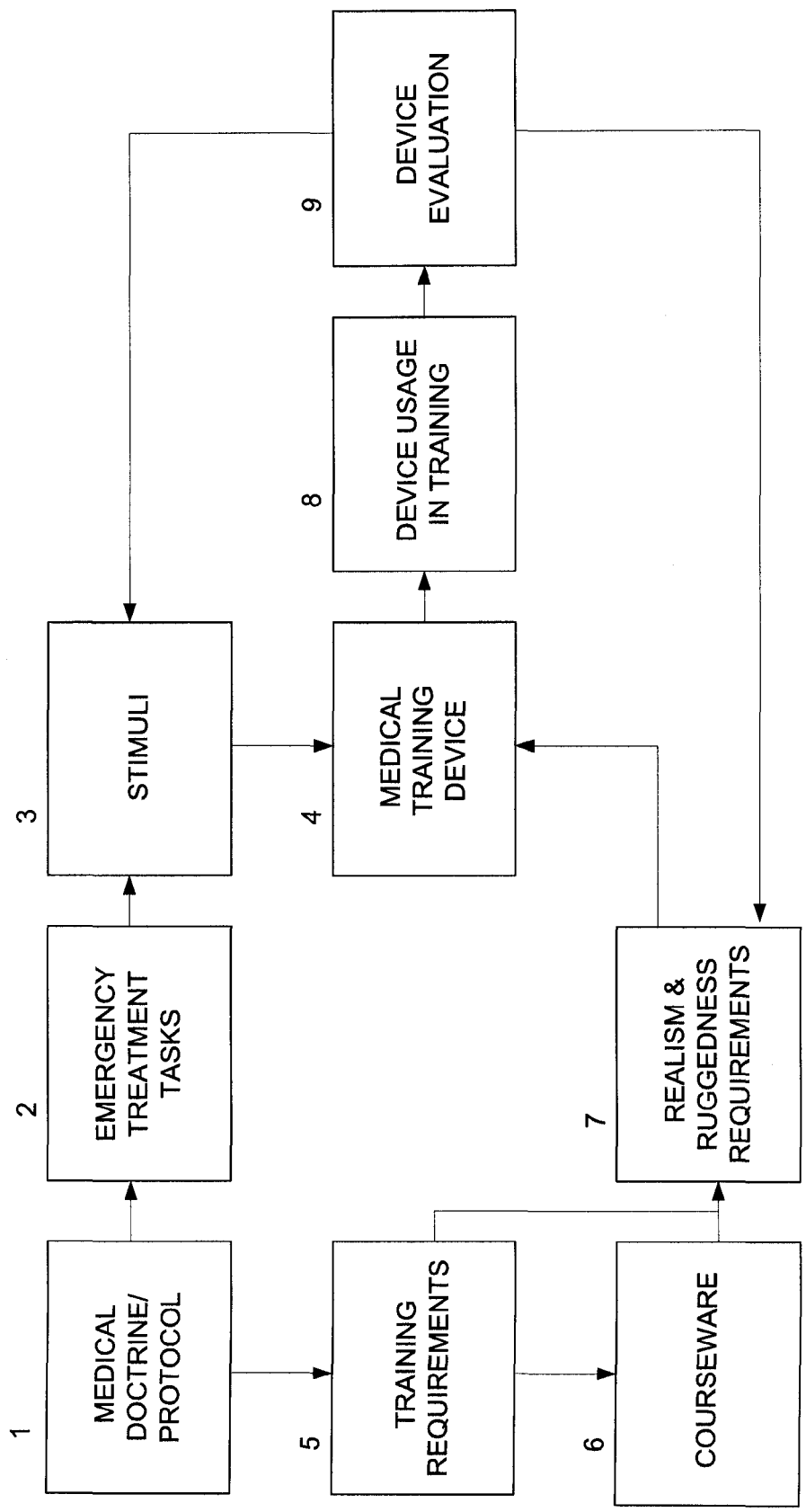
FIG. 1 is a schematic flow diagram illustrating an example method for building an anthropomorphic device in accordance with an embodiment of the present invention.

FIG. 1 is a schematic flow diagram illustrating an example method for building an anthropomorphic device in accordance with an embodiment of the present invention. The method starts with identification of medical doctrine or protocols 1. Source materials for this analysis included training course curricula, handbooks, protocols, manuals, and interviews with medical personnel. For the purposes of the training device, emergency treatment task requirements 2 are then identified from the medical doctrine or protocols. These are the tasks that medics, combat lifesavers and medical personnel must perform to treat patients within the first minutes after a blast. Initiation and performance of medical treatment tasks requires the medic to notice certain stimuli 3 which are provided by the training device 4. For example, an initial set of tasks for blast injury might include: triage decisions, airway clearing, breathing control, bleeding control, intravenous line, patient assessment for deformities, contusions, Abrasions, punctures/penetrations; burns, tenderness, lacerations, and swelling ("DCAP-BTLS"), fluid administration, monitoring, pain control, splinting fractures, antibiotics administration, and evacuation categorization. For example, some stimulus elements can include: (1) Massive Bleeding can be required to cue the medic that the patient should be triaged as immediate or expectant, to elevate the wound and apply a tourniquet and/or compression bandage (2) pulse and outflow of simulated blood from a limb can be required in order to allow the medic to practice regulation of the tourniquet (3) burns and fragments can be required to cue the medic to examine for other wounds (4) movement on pain can be required to cue the medic that splinting of bone fracture (hip) should be performed, (5) open wounds can be required to cue the medic to administer antibiotics, (6) dismemberment and massive bleeding from amputation can be required to cue the medic to decide that the patient should be evacuated as urgent/urgent-surgical which are categories for evacuation and further treatment.

Additional training requirements 5 pertaining to the training environment are which were developed by the trainers in order to define courseware 6 for the actual training are defined. These additional training requirements also pertain to the necessary ruggedness and realism 7. For realism or fidelity of the training device 4, and using tasks and stimulus elements, pictures of real combat and accident injuries are studied in order to define the types of wounds which would manifest the stimuli. For example, a diagonal amputation is used as a wound most likely to show continuous and voluminous bleeding. A right angle amputation is used as one likely to reduce bleeding on its own but one which needed to be monitored.

After the device receives usage in training 8, and device evaluation 9 information is obtained, such information is used (e.g. fed back) to increasingly improve the stimuli 3, and ruggedness and realism requirements 7.

Figures 2A, 2B:
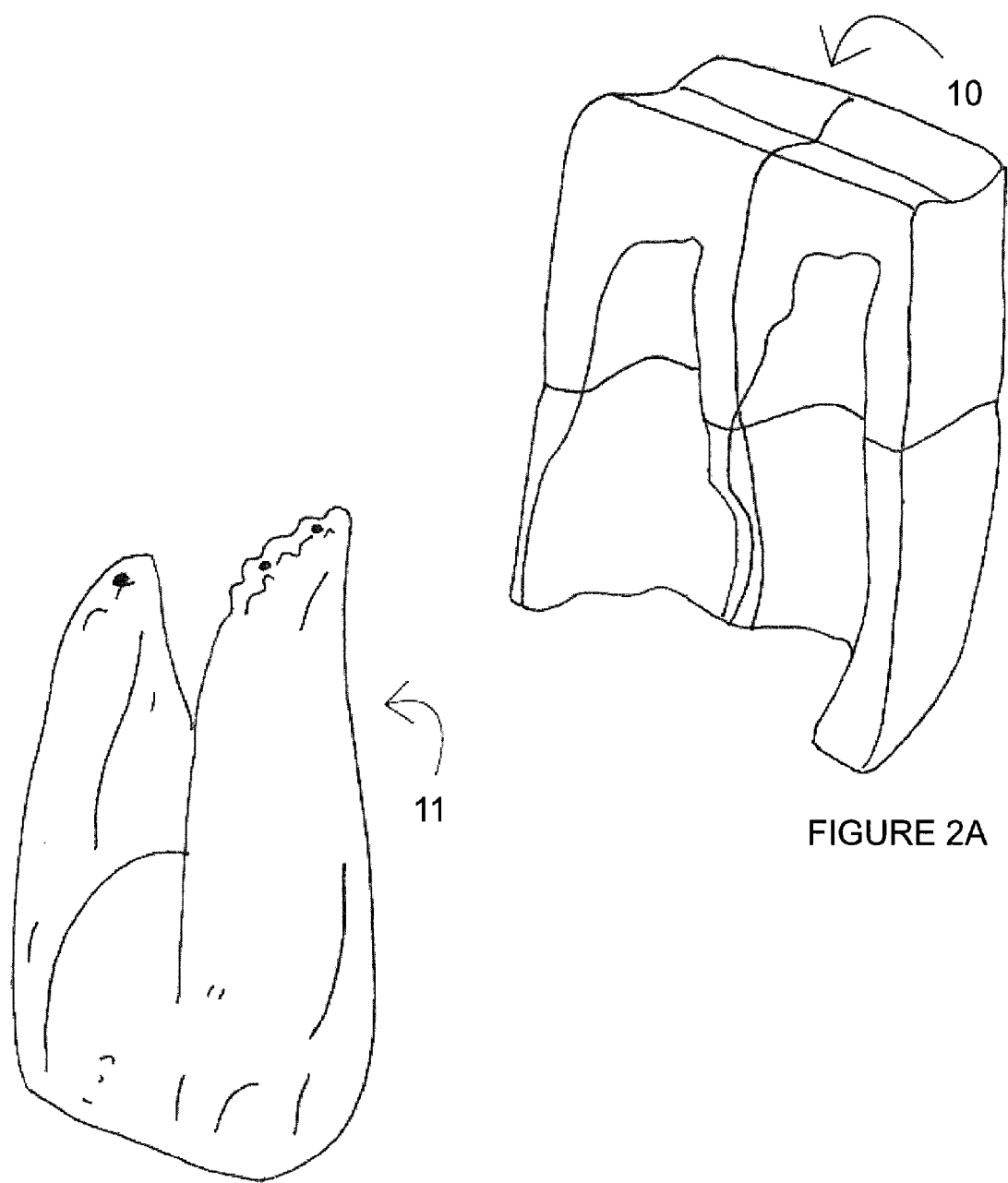
FIGS. 2A and 2B illustrate an example of molding and casting in accordance with an embodiment of the present invention.

FIGS. 2A and 2B illustrate an example in molding and casting in accordance with an embodiment of the present invention. Device construction involves the creation of a positive sculpture 11 which can either be sculpted or generated from a life-casting or produced using a computer numeric control machine, and can involve the creation of a negative hard foam mold 10. These two structures are used in well known molding/casting techniques to construct a master mold of the clay sculpture. The master mold will then be used to cast the outside surface of the device. In order to make the skin both realistic and rugged and water resistant, silicones such as Dragonskin can be used. The skin is poured from the outside to the inside with several layers. The Dragonskin can be appropriately tinted to simulate skin layers, skin coloring and wounds. Wounds can be incorporated into the skin or inserted later if forms are placed in the simulated skin in the shape of the realistic wound inserts.

Figure 3B:
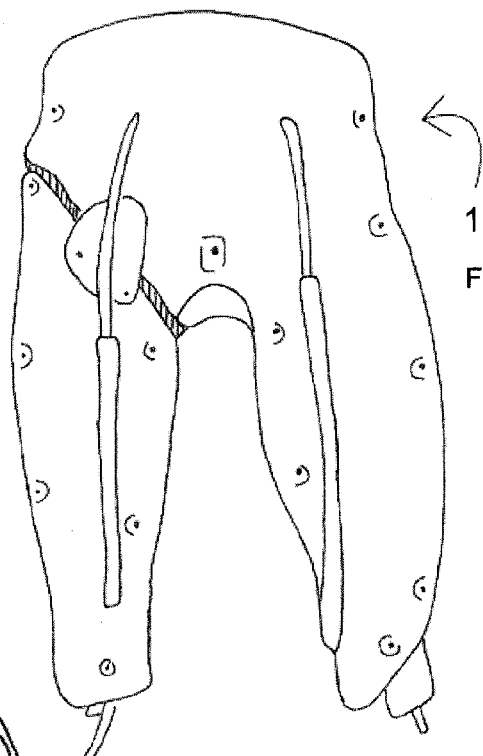
FIGS. 3A, 3B and 3C illustrate how a core fits into simulated "skin" in accordance with an embodiment of the present invention.
Figure 3C:
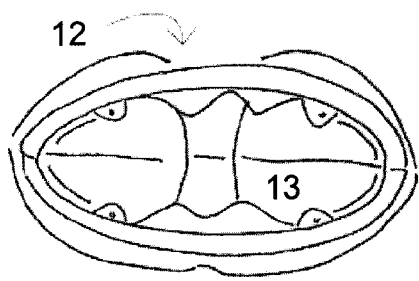
Figure 3A:
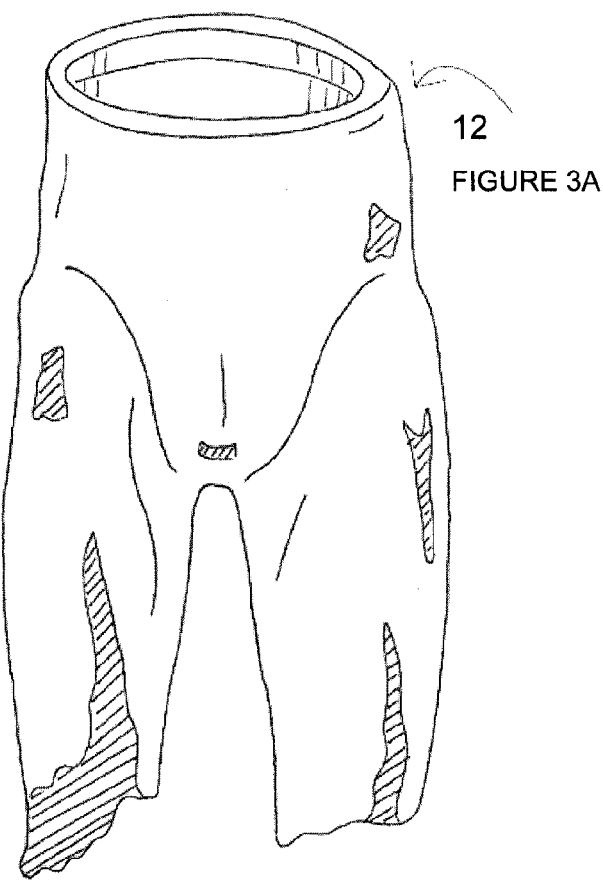

FIGS. 3A, 3B, and 3C illustrate how a core fits into simulated "skin" 12 in accordance with an embodiment of the present invention. The hard core 13 can be made of fiberglass or other hard material and adds to the ruggedness and water resistance of the training device by protecting the internal components. As shown in FIG. 3B, fiberglass or hard composite cores 13 can be used to maintain the hollowness of the legs and lower torso, and the device's various systems can be housed inside these cavities. Several well known methods can be used to form the positive molds for these cavities including hand carved or CNC machined forms made from any number of materials such as wood, foam, or plastic. Master molds of these core pieces are constructed, and a set of core pieces is cast. The finished core pieces are inserted into the master mold and fixed in place prior to the silicone skin being poured into the mold to create the skin layer of the device.

The penis and scrotum are cast as a separate unit to aide in demolding and are fastened to the upper torso with silicon glue and/or by screw into the hard core.

The outside skin is finished using paint to properly tint the wounds. Simulation of the singeing of the hair is also accomplished using a blow torch.

Figure 4:
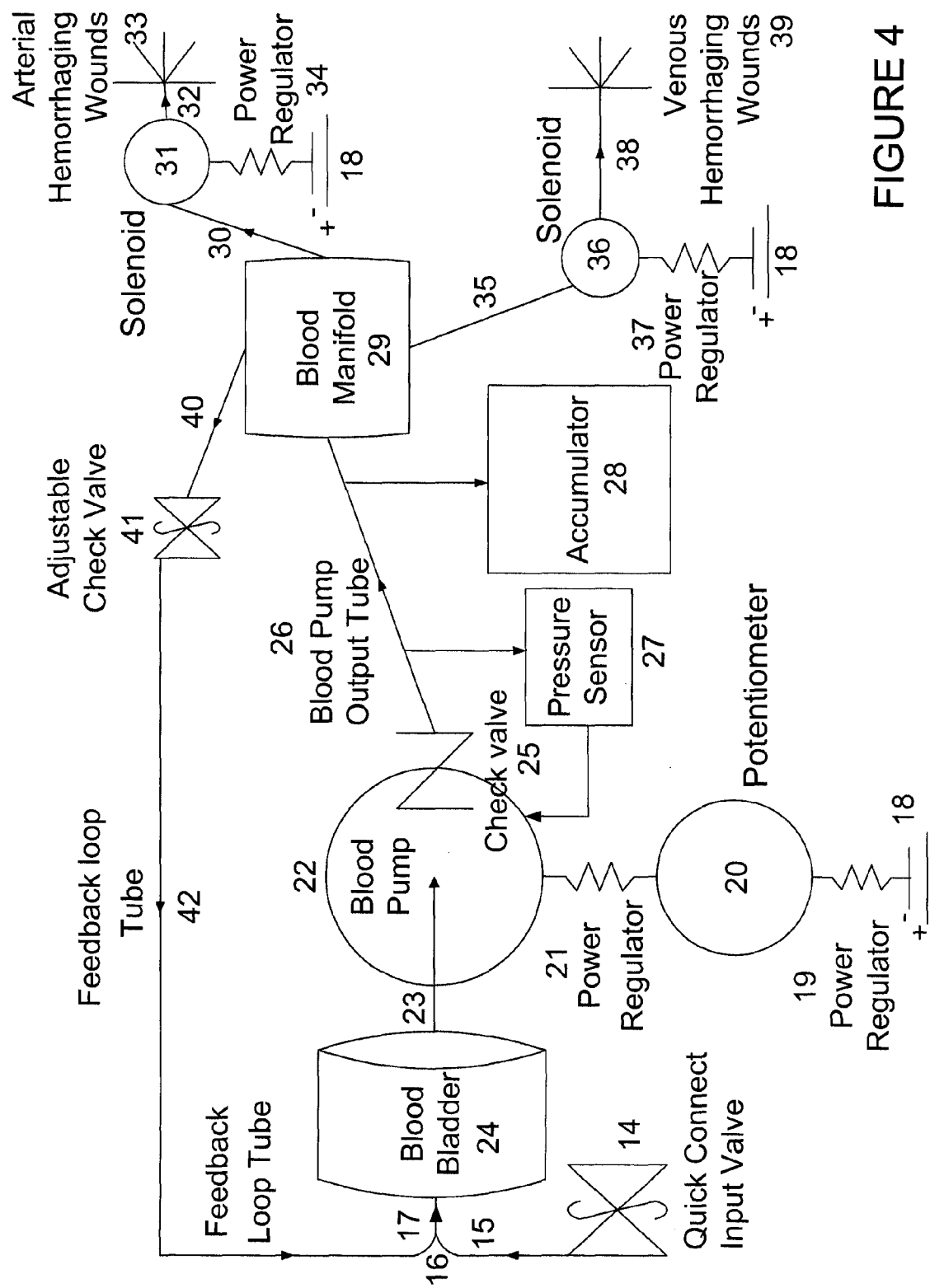
FIG. 4 is a schematic diagram of a simulated blood flow system showing a flow of simulated blood starting with filling through outflow through simulated arteries and veins in accordance with an embodiment of the present invention.

FIG. 4 is a schematic diagram of a simulated blood flow system showing a flow of simulated blood from filling through outflow through simulated arteries and veins in accordance with an embodiment of the present invention. The exemplary simulated blood system, shown in FIG. 4 includes a "Quick Connect" input valve 14 so that the blood system can be easily filled/refilled from an external reservoir (e.g. bucket) using a hose which terminates in a complementary Quick Connect using a gravity or pumped mechanism. The fill/refill blood proceeds through a t-connector 16 and hose 17 to the blood bladder 24. In a preferred embodiment, connections for the blood system can be made with tubing such as latex or vinyl, depending on which material is appropriate. In a preferred embodiment, the blood bladder 24 is filled by using a gravity feed method. As an example, a hole is drilled in the side of a five gallon bucket approximately one inch from the bottom. A male quick connect valve is attached to the hole with the male side facing out. The hole is sealed with a silicone caulk to make it watertight. The bucket is filled with water and the blood dye is added to the water. The water is stirred until the blood dye is completely mixed. A hose with a female quick connector on each end is attached to the male quick connectors on the bucket and the dummy. The bucket is then elevated to be higher than the dummy, thereby filling the blood bladder.

Figure 5:
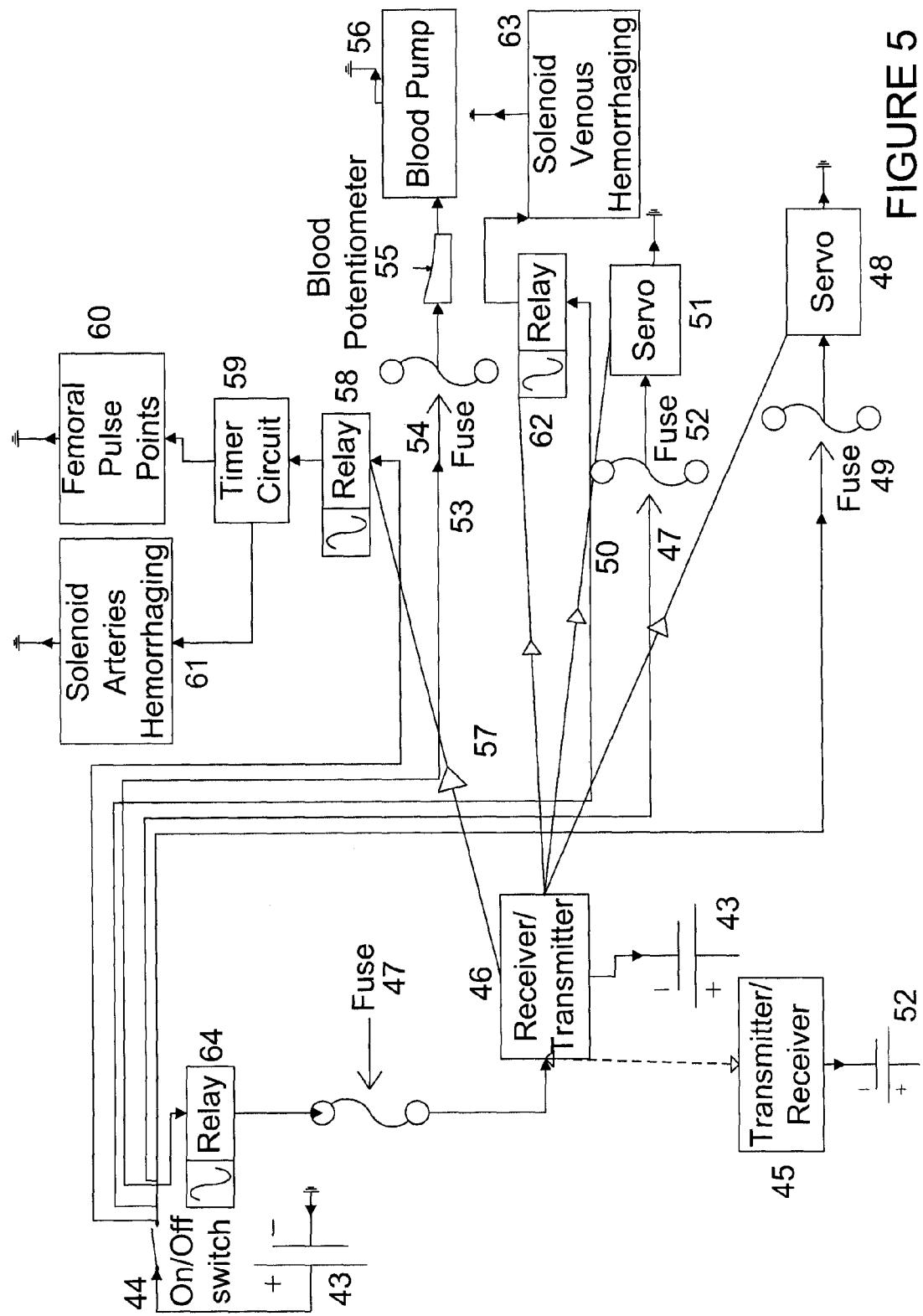
FIG. 5 is a schematic diagram of exemplary electrical and control subsystems for animatronics and bleeding control in accordance with an embodiment of the present invention.

In a preferred embodiment, a blood pump 22 is used to draw simulated blood from the blood bladder 24 and build pressure inside the accumulator 28. In a preferred embodiment, the blood pump used can be a 12VDC diaphragm pump while in others it can be an impeller pump. The blood pump is powered by batteries 18, so that the training device can be wireless. The current is adjusted using any suitable power regulators 19, 21 and potentiometer 20 so that the electrical requirements of the pump are met and so that the system pressure can be adjusted. A check valve 25 on or outside the pump 22 prevents return flow from the accumulator 28 and system. A pressure sensor 27 maintains constant pressure in the accumulator and system by activating the blood pump 22. The pump 22 can be a diaphragm pump if an accumulator is used or a direct drive impeller pump if no accumulator is used. A blood pump output tube 26 connects the blood pump to the check valve 25, pressure sensor 27, accumulator 28 and blood manifold 29. The blood manifold 29 connects with a tube 30 connecting to the arterial hemorrhage simulation(s) 33 through a solenoid 31 which regulates a "pulse" of blood to the simulated arterial wounds 33. The solenoid 31 obtains power from a battery 18. The power is regulated by a suitable power regulator 34. The blood manifold 29 also connects with a tube 35 connecting to the venous hemorrhage simulation(s) 39 through a solenoid 36 which turns on and off a continuous low level flow of blood to the simulated venous wounds 39. The solenoid 36 obtains power from a battery 18. The power is regulated by a suitable power regulator 37. Finally, the blood manifold may be connected through a feedback loop tube 40 through an adjustable cheek valve 41 and additional tubing 42 to the t-connector 16 in order to prevent unwanted pressure buildup. These solenoids 31 and 36 are normally closed when no power is supplied to them so that no blood will flow through them to the wound 33 and 39 when they receive no power. There are two types of wounds: arterial and venous. The arterial wounds are high pressure wounds that spurt and the venous wounds are low pressure wounds that have a constant flow. In a preferred embodiment, the arterial wounds 33 have no flow reduction from the blood manifold 29, so the fluid pressure at the wound is the same as at the output of the pump. The spurting action can be provided by the operation of the solenoid 31. In a preferred embodiment, a timer circuit FIG. 5 17 is used to operate the solenoids 31 and 36 and thus simulate the pulsing of blood. Both wound types are designed to be able to have the blood flow cut off to them either by remote control or by use of a tourniquet or direct pressure.

In a preferred embodiment, the blood system operates so that the blood flowing from any hemorrhaging wound can be stopped either with a tourniquet or sustained direct pressure to the wound. In one example, this can be done by having the tourniquet or the pressure applied to tubes 32 or 38. For example, in order to stop or slow the blood flow stop in certain configurations, the tubes 32 or 38 may be placed in a metal trough, or the tubes 32 and 38 can be placed at a depth in the silicone skin in the leg such that the user must apply a tourniquet to the leg with a realistic amount of force in order to shut the flow of blood off from the hemorrhaging wounds that are distal to the tourniquet. In a prototype, the amount of force needed to shut the flow of blood off to the wound was determined through consultation with Army Combat Medics.

FIG. 5 is a schematic diagram of exemplary electrical and control subsystems for animatronics and bleeding control in accordance with an embodiment of the present invention. In order to make the training device wireless, it should be battery-powered. In one example, batteries 43 can be 2 18VDC 3.0 A/hr Makita lithium ion power tool batteries in order to provide enough power for all electrical and control subsystems in the training device chassis. The batteries can be protected from short circuits with polyfuses (47, 52, 49 and 54) and/or circuit breakers. The training device chassis, simulating the lower body has a push-button on-off switch which turns on power to the chassis components. The chassis transmitter/receiver 46, for example Futaba R607FS, XBee XB27-BCIT-004 or XBee24-Z7CIT-004) is activated through a relay 64 and protected by a polyfuse 47 or circuit breaker. Voltage converters can also be used, if desired, to down-convert the voltage from 18V to 12V for the servos 48, 51 timer circuit 59, solenoid valves 61, 63, and blood pump 56, and to 6V or 3.3V for the RF receiver/transmitter 46. Each servo 48, 51 has a polyfuse 49, 52 to protect from over amperage and over voltage situations. In a preferred embodiment, the electrical and control subsystem wires are shielded twisted pair to reduce interference. The timer circuit 59 can be a simple 555 TTL type timer that is designed to send signals at approximately 60-90 pulses per minute to the arterial solenoids 61 and the pulse point servos 60. A potentiometer 55 can be used to control the voltage level to the blood pump 56. Manipulating the potentiometer 55 increases or decreases the voltage supplied to the pump 56. In this example, the RF transmitter/receiver in the chassis 46 can be used to control the relays 58, 62 that govern the arterial blood solenoids 61 and the pulse points 60, and the venous blood solenoids 63. These relays 58, 62 in turn supply power to their respective circuits when the relays are on. When the relays are turned off the power to their respective circuits 59, 63 is off. The chassis RF transmitter receiver 46 can also control the movement of the servos. In a preferred embodiment power is supplied to the servos as long as the dummy is turned on. In addition simple hobby servos 60 can be placed under the skin in the pelvic area to simulate the femoral pulse points. These can be controlled by the timer circuit that also controls the solenoids.

In a preferred embodiment, the animatronics system can include servos 48, 51, servo linkages, servo mount, and hip joints which allow for movement of the hard body 13. Movement can be provided, for example, by two rotational or linear servos 48, 51. Each servo can be protected by polyfuses 47, 52 that prevent over-amperage and over-voltage conditions. In the discussed example, the servos 48, 51 are mounted 90 degrees apart in their orientation so that when the anthropomorphic training device is laying down on its backside one servo controls horizontal movement and another servo controls vertical movement. Each servo is held in place using a suitable mount. Each servo can include a torque limiter attached to the servo output shaft. A sprocket gear can be mounted to the torque limiter so that a chain (or other suitable drive, belt, cable, gear etc.) can be used to transfer the servo's torque to provide movement. As an alternative drive, gear-driven pieces or direct linkages can be used to replace cable-driven pieces. This approach allows the mounting system to be the same.

In a preferred embodiment, a horizontal movement drive (e.g., chain) is firmly attached to two mounting points in the right leg, and the chain loops around the servo sprocket. Several sprockets can be mounted in the hip area on the left and right side to provide a path for the chains to travel on and keep tension on the chain. When the horizontal movement servo turns one direction, both legs will move outwards. When this servo rotates in the other direction, both legs will move inwards.

As noted above, torque limiters can be used on the servos 48, 51. The torque limiter protects the servo from physical stress such as shock and excessive force used to hold down the dummy's legs. For example, when torque is applied to the sprocket that exceeds the force being applied by the servo, the adjustable friction surfaces inside the torque limiter release thereby uncoupling the servo drive force from the moving surface.

In a preferred embodiment, remote control of movement and simulated bleeding and monitoring of chassis status can be performed using an external remote control radio control transmitter/receiver 45 which communicates with the internal chassis transmitter/receiver 46. In a preferred embodiment, the servos are controlled by a Futaba 2.4 GHz spread spectrum transmitter and receiver. An example of this type of radio control system is the Futaba 6EX radio transmitter and Futaba R607FS receiver. Either an analog controllers, such as the Futaba model airplane controller or digital controllers, using a computer or hand-held digital device can be used. Other examples of transmitter/receivers which can be used include the Xbee XB024-BCIT-004 and the XBee XB24-ZCIT-004 which can serve as either chassis or remote control devices.

In a preferred embodiment, injuries to bones, broken pelvis and exterior wounds can be simulated. For example such injuries can be constructed in the "skin" 12 and hard body 13, in the following manner. Protruding bones are flexibly mounted so that they do not break when they are bent. This can be accomplished using, for example, a spring loaded connection similar to certain car mounted radio antennas. The protruding bones provide visual stimuli of bone injuries such, for example, as broken bone, a shattered bone or a crushed bone.

A simulation of a broken pelvis can be constructed using a pumice bag. One side of the pelvic girdle hard body 13 will move inwards approximately ½ inch to simulate the movement of a broken pelvis. The pumice filled bag is inserted behind the moving part to give a crunchy feel. The moving part can be spring-loaded to give resistance. Also in a preferred embodiment, wounds all along the exterior can be made removable by, for example, making wounds wider at their base than at the surface, so they are held in place by friction when inserted into a wound cavity. The amputations are both fit onto the ends of the legs.

Operation of a device in accordance with a preferred embodiment is performed as follows: (1) Batteries 18 and 43 are charged. (2) The blood reservoir is filled by first filling the bucket that has the quick connect valve built into it with blood. Then the hose with a quick connector on each end is plugged into the bucket and to the connector 14 on the lower torso. The bucket is placed at a higher elevation than the blood bladder 24 inside the lower torso to fill the blood bladder. The system is easily filled by using gravity instead of pressure. (3) The receiver/transmitter 45 and 46 modules are easily coordinated by following standard module instructions. An external alignment push button switch on a hip is provided for ease of alignment 44. The pulse points 60, blood pump 56, and animatronics are tested prior to use by moving their corresponding buttons and joysticks on the external transmitter/receiver 46. The pulse points are turned on prior to trainees touching the dummy. The blood pump 56 is turned on when training exercises are started. Preferably, the blood solenoids 31 and 36; 61 and 63 are not turned on until the trainees are within sight of the dummy. The exterior skin 12 of the dummy must be cleansed with clean water only. The blood simulation system should be washed out with clean water and then filled with clean water. The blood pump 22 should be turned on and allowed to run while the blood filling system, filled with tap water, is connected to the dummy. The blood pump 22 should be allowed to run for several minutes or until the blood coming out of all wounds is clear.

The invention claimed is:

1. An anthropomorphic medical device providing realistic physical stimuli to prompt appropriate medical responses in a user, comprising:
   an articulated human body portion, including:
      a hollow hardened core including at least one articulated joint, a simulated protruding bones flexibly connected to the core and constructed and arranged to provide visual stimuli of bone injuries, and
      a movable portion located in a region approximating the location of a pelvis structure to be movable when depressed so as to simulate a broken pelvis, and
      a molded simulated tissue layer fitted to the core, wherein the molded simulated tissue layer includes simulated wounds;
   a blood circulatory system supported at least in part by the core, including a pump system structured to provide desired bleeding stimuli, and positioned with respect to the stimulated tissue layer so as to allow physical pressure to be applied thereto by a user to alter the bleeding stimuli;
   a flexible container including a crushed material positioned in proximity to the movable portion so as to provide a crunching movement to simulate a broken pelvis; and
   a body movement system supported at least in part by the support structure and structured to move desired portions of the articulated body portion to provide desired body movement stimuli.

2. An anthropomorphic medical device according to claim 1, where in the pump system includes flow regulators controllable to provide at least one of a pulsing flow and a substantially constant flow.

3. An anthropomorphic medical device according to claim 1, wherein the blood circulatory system includes flexible tubing positioned so that pressure on the simulated tissue layer causes the tubing to restrict.

4. An anthropomorphic medical device according to claim 1, wherein a molded simulated tissue layer includes forms in the shape of simulated wounds, and the simulated wounds are replaceably inserted into the molded simulated tissue layer.

5. An anthropomorphic medical device according to claim 1, wherein the pump system includes a control structure for providing a substantially constant bleeding stimuli.

6. An anthropomorphic medical device according to claim 1, wherein the pump system includes a control structure for providing a pulsing bleeding stimuli.

7. An anthropomorphic medical device according to claim 5, wherein the control structure includes at least one solenoid connected to control the substantially constant bleeding stimuli.

8. An anthropomorphic medical device according to claim 6, wherein the control structure includes at least one solenoid connected to effect the pulsing bleeding stimuli.

9. An anthropomorphic medical device according to claim 1, wherein the hardened support structure includes a lightweight hard material.

10. An anthropomorphic medical device according to claim 9, wherein the lightweight hard material includes fiberglass.

11. An anthropomorphic medical device according to claim 1, wherein the stimulated tissue layer comprises material structured to appear as human skin.

12. An anthropomorphic medical device according to claim 1, wherein the stimulated tissue layer comprises silicone.

13. An anthropomorphic medical device according to claim 1, further comprising a remote control system connected to remotely control at least one of the remote control blood circulatory system and the body movement system.

* * * * *